Dec. 21, 1926.
L. HAINES
1,611,187
INDICATING DEVICE FOR AUTOMOBILES
Filed Jan. 18, 1926
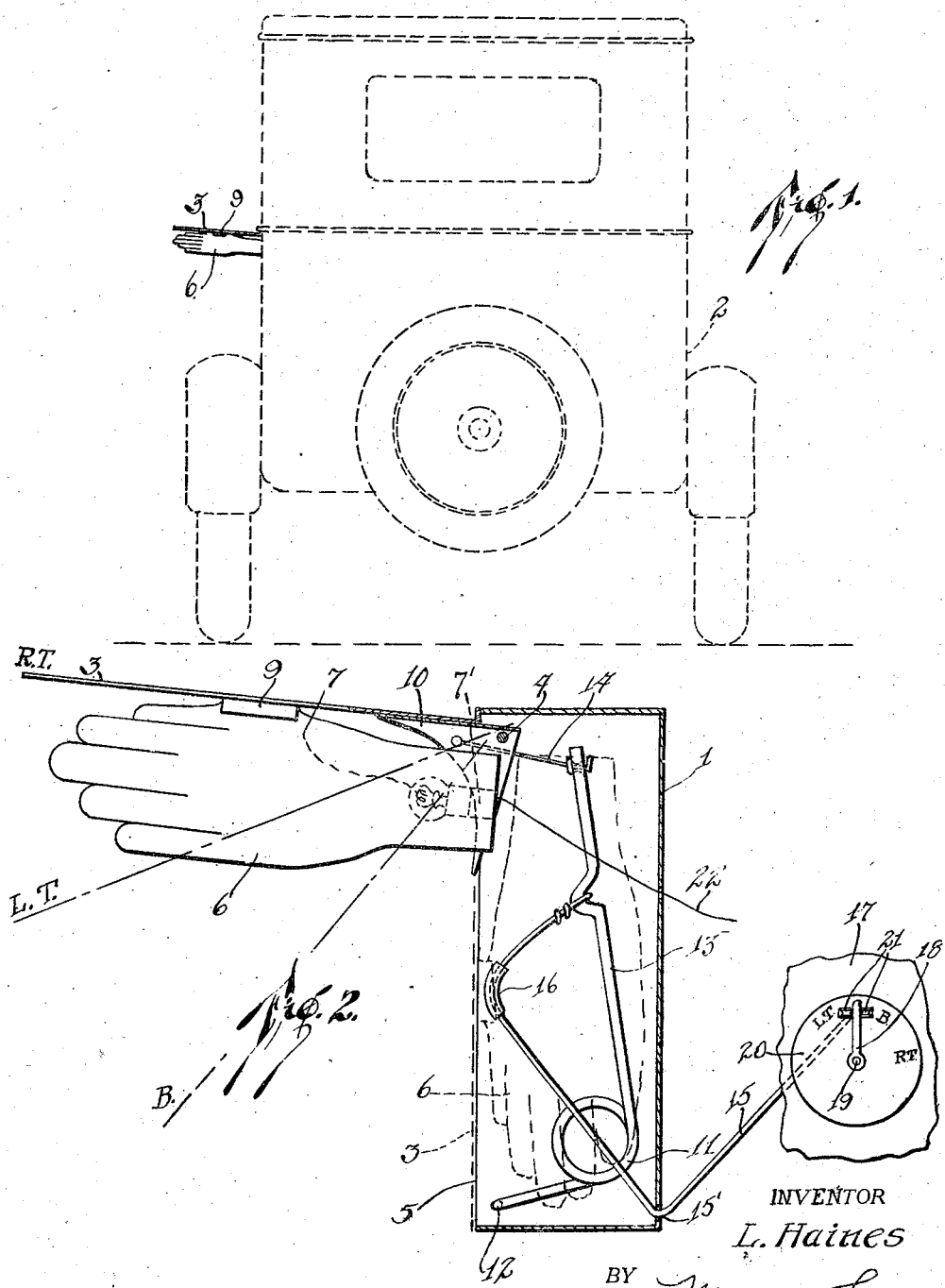
INVENTOR
L. Haines
BY
ATTORNEYS Patented Dec. 21, 1926.

1,611,187

UNITED STATES PATENT OFFICE.

LEROY HAINES, OF COLCHESTER, ILLINOIS.

INDICATING DEVICE FOR AUTOMOBILES.

Application filed January 18, 1926. Serial No. 82,059.

My invention relates to improvements in indicating devices for automobiles, and it consists in the combinations, constructions, and arrangements herein described and claimed.

An object of my invention is to provide an indicating device for automobiles which may be disposed and concealed in the rear portion of the car, the body being provided with a recess for permitting the illuminated hand to be swung into operative position for warning traffic.

A further object of my invention is to provide a device of the type described which makes use of novel spring means for actuating the signal hand.

A further object of my invention is to provide a device of the type described which is simple in construction, durable and thoroughly efficient for the purpose intended.

Other objects and advantages will appear in the following specification, and the novel features of the invention will be particularly pointed out in the appended claims.

My invention is illustrated in the accompanying drawings, forming part of this application, in which Figure 1 is a rear elevation of a car showing the device in operative position, and Figure 2 is a vertical section through the device.

In carrying out my invention, I provide a casing 1 which may be entirely enclosed in a car 2, as shown in Figure 1, or may be secured to the rear of the car in exposed position. The casing is provided with a cover 3 hinged at 4 and adapted to close the open side 5 of the casing.

The cover also acts as an arm for a signal hand 6. The hand is preferably transparent and flesh colored, thereby closely resembling a human hand.

Furthermore, the hand is hollow and receives an electric light 7 in the wrist portion thereof, the light in turn being connected to a source of current. In practice, the wire 22 is connected to the tail light wire. The light socket 7' is grounded, thus completing the circuit through the light each time the tail light is energized.

The hand 6 is secured to the cover 3 at 9 and has its wrist portion secured to guide members 10. The cover 3, together with the guide members 10, close the opening 5 when the hand is in inoperative position, and prevent foreign matter from gaining access to the interior of the casing 1.

The hand is adapted to be swung into various positions for indicating right turn, left turn, and back. In Figure 2, I show these three positions as being indicated by the letters R. T., L. T., and B. The means for actuating the arm consists of a coil spring 11 secured to the casing 1 at 12 and having an arm 13 operatively connected to the cover 3 by means of a link 14. Figure 2 shows the spring 11 in operative position. The arm 13 of this spring moves toward the wall of the casing in swinging the hand 6 into inoperative position.

The arm 13 is manually moved by means of a cable 15 that has one of its ends secured to the arm, the cable then being passed through a curved tubular member 16, out through the bottom of the casing, thence over a series of guiding means, not shown, to the instrument board 17 of the car. A lever 18 is connected to the cable. It is obvious that the cable may be connected to the foot brake and be actuated when the pedal is actuated, if so desired.

The lever 18 is pivoted at 19 and is adapted to be swung to the position R. T. on the dial 20 when the operator desires to raise the hand 6 into the position R. T. A swing of the lever 18 to the left into a position L. T. on the dial 20 will swing the signal hand 6 into the L. T. position. It should be noted that the letters L. T. are disposed nearer the lever 18 when the lever is in normal position than are the letters R. T. The lever 18 is also adapted to be swung into the position for indicating that the car is to back up. The cable 15 is passed between guide rollers 21 and then is connected to the lever 18, whereby a swinging of the lever will actuate the signal hand in the manner just described. It is obvious that any other manually operated mechanism may be substituted for the one disclosed for actuating the signal hand. The cable 15 is passed through an opening 15' in the bottom of the casing 1.

From the foregoing description of the various parts of the device, the operation thereof may be readily understood. The driver, when desiring to make a turn or to stop, swings the lever 18 to the right, thus swinging the arm 13 into full line position if the driver wishes to make a right turn.

The arm is swung into either one of the other two positions designated by L. T. and B. if the driver wishes to make a left turn or to back up. Of course the lever 18 is moved different distances to correspond with the various positions into which the hand is swung.

The movement of the lever 18 on the instrument board 17 flexes the spring 11, and of course the spring will tend to return the arm 13 to normal or inoperative position. This movement takes place as soon as the driver releases the lever 18. As stated before, the signal is energized when the tail light is turned on. The device is extremely simple in construction, and provides a novel and efficient means for warning drivers in approaching cars as to what the car ahead is about to do.

I claim:

1. A device of the type described comprising a casing, a cover pivotally mounted upon said casing, a signal rigidly mounted upon said cover, a light disposed in said signal, a coil spring secured to said casing, an arm integral with said coil spring, a link operatively connecting said arm to said cover, manually controlled means for moving said arm against the tension of said coil spring for swinging said cover and said signal into operative positions, said coil spring adapted to return said cover and said signal to normal position.

2. A device of the type described comprising a casing, a cover pivotally mounted upon said casing, a signal rigidly mounted upon said cover, a light disposed in said signal, a coil spring, one end of said coil spring secured to said casing, an elongated arm integral with the other end of said coil spring, a link operatively connecting said arm to said cover, a cable secured at one end to said arm, and manually controlled means secured to the other end of said cable for moving said arm against the tension of said coil spring for swinging said cover and said signal into operative positions, said coil spring being adapted to return said cover and said signal to their normal positions.

LEROY HAINES.